US008611397B2

(12) United States Patent
Norman et al.

(10) Patent No.: US 8,611,397 B2
(45) Date of Patent: Dec. 17, 2013

(54) METHOD AND SYSTEM FOR EFFICIENT DSSS FFT PROCESSING EMPLOYING PRIME FACTOR DECOMPOSITION

(75) Inventors: Charles Norman, Huntington Beach, CA (US); Andreas Warloe, Fountain Valley, CA (US); Charles Abraham, Los Gatos, CA (US); Jared Welz, Seal Beach, CA (US)

(73) Assignee: Broadcom Corporation, Irvine, CA (US)

( * ) Notice: Subject to any disclaimer, the term of this patent is extended or adjusted under 35 U.S.C. 154(b) by 875 days.

(21) Appl. No.: 12/643,494

(22) Filed: Dec. 21, 2009

(65) Prior Publication Data

US 2011/0150047 A1 Jun. 23, 2011

(51) Int. Cl.
*H04B 1/00* (2006.01)
(52) U.S. Cl.
USPC ........... 375/147; 375/140; 375/142; 375/150; 375/316
(58) Field of Classification Search
USPC .......................... 375/147, 316, 140, 142, 150
See application file for complete search history.

(56) References Cited

U.S. PATENT DOCUMENTS 5,999,561 A * 12/1999 Naden et al. ................. 375/142
6,639,939 B1 * 10/2003 Naden et al. ................. 375/140

OTHER PUBLICATIONS

An Algorithm for the Machine Calculation of Complex Fourier Series—Cooley and Tukey 1964.
Automatic Generation of prime Length Programs—Selesnick 1996.

\* cited by examiner

*Primary Examiner* — Ted Wang
(74) *Attorney, Agent, or Firm* — Sterne, Kessler, Goldstein & Fox P.L.L.C.

(57) ABSTRACT

A direct-sequence spread spectrum (DSSS) receiver may be operable to process signal samples in frequency domain utilizing a prime factor fast Fourier transform (FFT) circuit and a pseudorandom noise (PRN) code. The DSSS receiver may be operable to transform the signal samples into FFT signal samples using the prime factor FFT circuit, transform the PRN code into a FFT PRN code using the prime factor FFT circuit and multiply the FFT signal samples with the FFT PRN code using the prime factor FFT circuit. The DSSS receiver may be operable to inversely transform the multiplied FFT signal samples into correlated signal samples using a prime factor inverse FFT (IFFT) implemented by the prime factor FFT circuit. The prime factor FFT circuit may comprise a prime length FFT core, a FFT memory, a register bank, a switch, a multiplier and a FFT controller.

20 Claims, 5 Drawing Sheets

METHOD AND SYSTEM FOR EFFICIENT DSSS FFT PROCESSING EMPLOYING PRIME FACTOR DECOMPOSITION

CROSS-REFERENCE TO RELATED APPLICATIONS/INCORPORATION BY REFERENCE

[Not applicable]

FIELD OF THE INVENTION

Certain embodiments of the invention relate to communication systems. More specifically, certain embodiments of the invention relate to a method and system for efficient DSSS FFT processing employing prime factor decomposition.

BACKGROUND OF THE INVENTION

Direct sequence spread spectrum (DSSS) is a modulation technique for digital signal transmission over the airwaves. The DSSS phase-modulates a sine wave pseudo-randomly with a continuous string of pseudorandom noise (PRN) code symbols call "chips", each of which has a much shorter duration than an information bit. That is, each information bit is modulated by a sequence of much faster chips. Therefore, the chip rate is much higher than the information signal bit rate. The DSSS uses a signal structure in which the sequence of chips produced by a transmitter is known a priori by a receiver. The receiver may then use the same PRN code sequence to counteract the effect of the PRN code sequence on the received signal in order to reconstruct the information signal.

DSSS transmissions multiply the data or information being transmitted such as, for example, messages from a global navigation satellite system (GNSS) by a PRN code sequence thereby spreading the energy of the original signal into much wider band. The resulting signal resembles white noise and this noise-like signal may be used to exactly reconstruct the original data or information at a receiver such as, for example, a GNSS receiver by multiplying the noise-like signal by the same PRN code sequence. This process, known as de-spreading, mathematically constitutes a correlation of the transmitted PRN code sequence with the PRN code sequence that the receiver believes the transmitter is using. Correlating all possible delays of the transmitted PRN code with the reference PRN code sequence mathematically constitutes convolution. The processing required for convolution is reduced by transforming the PRN codes to the frequency domain.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for efficient DSSS FFT processing employing prime factor decomposition, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for efficient DSSS FFT processing employing prime factor decomposition. In various embodiments of the invention, a direct-sequence spread spectrum (DSSS) receiver may be operable to process a plurality of signal samples in frequency domain utilizing a prime factor fast Fourier transform (FFT) circuit and a pseudorandom noise (PRN) code. In this regard, the DSSS receiver may be operable to transform the plurality of signal samples into a plurality of FFT signal samples using a prime factor FFT implemented by the prime factor FFT circuit. The DSSS receiver may be operable to transform the PRN code into a FFT PRN code using the prime factor FFT implemented by the prime factor FFT circuit. The DSSS receiver may be operable to multiply the plurality of FFT signal samples with the FFT PRN code using the prime factor FFT circuit. The DSSS receiver may be operable to inversely transform the plurality of multiplied FFT signal samples into a plurality of correlated signal samples using a prime factor inverse FFT (IFFT) implemented by the prime factor FFT circuit. The DSSS receiver may be operable to perform a plurality of prime length FFTs during the prime factor FFT using a prime length FFT core in the prime factor FFT circuit recursively. The DSSS receiver may be operable to perform the plurality of prime length FFTs with adjusted factors during the prime factor IFFT using the prime length FFT core in the prime factor FFT circuit recursively. In this regard, same sample order at completion of the processing of the plurality of signal samples in frequency domain may be maintained by recursively performing the plurality of prime length FFTs in reversed order during the prime factor IFFT.

The DSSS receiver may be operable to store data from an output of the prime length FFT core temporarily for fetching and/or recombination during each iteration of the plurality of prime length FFTs using a FFT memory in the prime factor FFT circuit. The DSSS receiver may be operable to determine a data flow between the output of the prime length FFT core and the FFT memory during each iteration of the plurality of prime length FFTs using a register bank in the prime factor FFT circuit. The DSSS receiver may be operable to reorder the data in the FFT memory for an input of the prime length FFT core during each iteration of the plurality of prime length FFTs using a switch in the prime factor FFT circuit. The DSSS receiver may be operable to correlate the plurality of signal samples with the PRN code by multiplying the data associated with the plurality of FFT signal samples with the FFT PRN code during each iteration of the plurality of prime length FFTs using a multiplier in the prime factor FFT circuit. The DSSS receiver may be operable to control a sequence for the register bank, the switch and the multiplier working together with the prime length FFT core during each iteration of the plurality of prime length FFTs using a FFT controller in the prime factor FFT circuit.

The DSSS receiver may comprise a global navigation satellite system (GNSS) receiver such as, for example, a global positioning system (GPS) receiver, a GLObal NAvigation Satellite System (GLONASS) receiver, a Galileo receiver, a Compass receiver, a quasi-zenith satellite system (QZSS) receiver and/or an Indian regional navigation satellite system (IRNSS) receiver.

Figure 1:
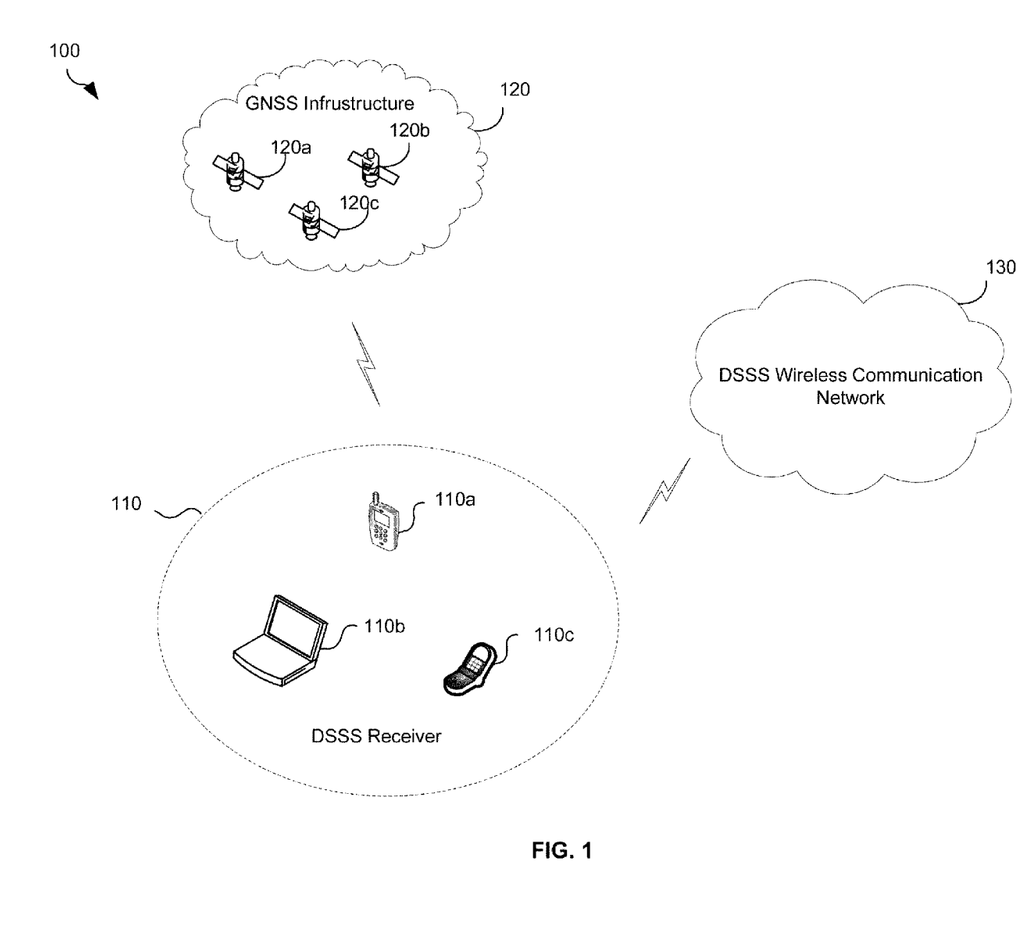
FIG. 1 is a block diagram illustrating an exemplary communication system that is operable to provide efficient DSSS FFT processing employing prime factor decomposition, in accordance with an embodiment of the invention.

FIG. 1 is a block diagram illustrating an exemplary communication system that is operable to provide efficient DSSS FFT processing employing prime factor decomposition, in accordance with an embodiment of the invention. Referring to FIG. 1, there is shown a communication system 100. The communication system 100 comprises a plurality of DSSS receivers 110 of which DSSS receivers 110a-110c are illustrated, a GNSS infrastructure 120 and a DSSS wireless communication network 130. The GNSS infrastructure 120 comprises a plurality of GNSS satellites such as GNSS satellites 120a through 120c.

The DSSS receiver such as the DSSS receiver 110a may comprise suitable logic, circuitry, interfaces and/or code that may be operable to communicate radio signals across the DSSS wireless communication network 130. The DSSS receiver 110a may be operable to receive, for example, GNSS broadcast signals from a plurality of visible GNSS satellites such as GNSS satellites 120a through 120c in the GNSS infrastructure 120.

The DSSS receiver 110a may be operable to process a plurality of signal samples in the frequency domain utilizing a prime factor FFT circuit and a PRN code. A prime factor FFT is a FFT that re-expresses the discrete Fourier transform (DFT) of a size N=N(1)N(2) as, for example, a two-dimensional N(1)×N(2) DFT, but only for the case where N(1) and N(2) are relatively prime. These smaller or decomposed transforms of size N(1) and N(2) can then be evaluated by applying prime length FFTs recursively. The prime factor FFT may be implemented in hardware, for example, using a prime factor FFT circuit.

The DSSS receiver 110a may be operable to transform the plurality of signal samples into a plurality of FFT signal samples using a prime factor FFT implemented by the prime factor FFT circuit. The DSSS receiver 110a may be operable to transform the PRN code into a FFT PRN code using the prime factor FFT implemented by the prime factor FFT circuit. The DSSS receiver 110a may be operable to multiply the plurality of FFT signal samples with the FFT PRN code using the prime factor FFT circuit. The DSSS receiver 110a may be operable to inversely transform the plurality of multiplied FFT signal samples into a plurality of correlated signal samples using a prime factor IFFT implemented by the prime factor FFT circuit. The DSSS receiver 110a may be operable to perform a plurality of prime length FFTs during the prime factor FFT using a prime length FFT core in the prime factor FFT circuit recursively. The DSSS receiver 110a may be operable to perform the plurality of prime length FFTs with adjusted factors during the prime factor IFFT using the prime length FFT core in the prime factor FFT circuit recursively. In this regard, same sample order at completion of the processing of the plurality of signal samples in frequency domain may be maintained by recursively performing the plurality of prime length FFTs in reversed order during the prime factor IFFT.

The DSSS receiver 110a may be operable to store data from an output of the prime length FFT core temporarily for fetching and/or recombination during each iteration of the plurality of prime length FFTs using a FFT memory in the prime factor FFT circuit. By fetching and/or recombining data stored in the FFT memory, a large FFT may be performed by using a small decomposed prime length FFT core recursively. The DSSS receiver 110a may be operable to determine a data flow between the output of the prime length FFT core and the FFT memory during each iteration of the plurality of prime length FFTs using a register bank in the prime factor FFT circuit. The DSSS receiver 110a may be operable to reorder the data in the FFT memory for an input of the prime length FFT core during each iteration of the plurality of prime length FFTs using a switch in the prime factor FFT circuit. The DSSS receiver 110a may be operable to correlate the plurality of signal samples with the PRN code by multiplying the data associated with the plurality of FFT signal samples with the FFT PRN code during each iteration of the plurality of prime length FFTs using a multiplier in the prime factor FFT circuit. The DSSS receiver 110a may be operable to control a sequence for the register bank, the switch and the multiplier working together with the prime length FFT core during each iteration of the plurality of prime length FFTs using a FFT controller in the prime factor FFT circuit.

In an exemplary embodiment of the invention, the DSSS receiver 110a may comprise a GNSS receiver such as, for example, a GPS receiver, a GLONASS receiver, a Galileo receiver, a Compass receiver, a QZSS receiver and/or an IRNSS receiver.

A GNSS satellite such as the GNSS satellite 120a may comprise suitable logic, circuitry, interfaces and/or code that may be operable to provide satellite navigational information or data to various GNSS receivers on earth such as, for example, the DSSS receivers 110a through 110c.

The DSSS wireless communication network 130 may comprise suitable logic, circuitry, interfaces and/or code that may be operable to provide voice and data services to various DSSS receivers such as the DSSS receiver 110a by using DSSS wireless communication technologies comprising, for example, WCDMA and CDMA.

In operation, the DSSS receiver 110a may be operable to process a plurality of signal samples in frequency domain utilizing a prime factor FFT circuit and a PRN code. The DSSS receiver 110a may be operable to transform the plurality of signal samples into a plurality of FFT signal samples using a prime factor FFT implemented by the prime factor FFT circuit. The DSSS receiver 110a may be operable to transform the PRN code into a FFT PRN code using the prime factor FFT implemented by the prime factor FFT circuit. The DSSS receiver 110a may be operable to multiply the plurality of FFT signal samples with the FFT PRN code using the prime factor FFT circuit. The DSSS receiver 110a may be operable to inversely transform the plurality of multiplied FFT signal samples into a plurality of correlated signal samples using a prime factor IFFT implemented by the prime factor FFT circuit. The DSSS receiver 110a may be operable to perform a plurality of prime length FFTs during the prime factor FFT using a prime length FFT core in the prime factor FFT circuit recursively. The DSSS receiver 110a may be operable to perform the plurality of prime length FFTs with adjusted factors during the prime factor IFFT using the prime length FFT core in the prime factor FFT circuit recursively. In this regard, same sample order at completion of the processing of the plurality of signal samples in frequency domain may be maintained by recursively performing the plurality of prime length FFTs in reversed order during the prime factor IFFT.

The DSSS receiver 110a may be operable to store data from an output of the prime length FFT core temporarily for fetching and/or recombination during each iteration of the plurality of prime length FFTs using a FFT memory in the prime factor FFT circuit. The DSSS receiver 110a may be operable to determine a data flow between the output of the prime length FFT core and the FFT memory during each iteration of the plurality of prime length FFTs using a register bank in the prime factor FFT circuit. The DSSS receiver 110a may be operable to reorder the data in the FFT memory for an input of the prime length FFT core during each iteration of the plurality of prime length FFTs using a switch in the prime factor FFT circuit. The DSSS receiver 110a may be operable to correlate the plurality of signal samples with the PRN code by multiplying the data associated with the plurality of FFT signal samples with the FFT PRN code during each iteration of the plurality of prime length FFTs using a multiplier in the prime factor FFT circuit. The DSSS receiver 110a may be operable to control a sequence for the register bank, the switch and the multiplier working together with the prime length FFT core during each iteration of the plurality of prime length FFTs using a FFT controller in the prime factor FFT circuit.

Figure 2:
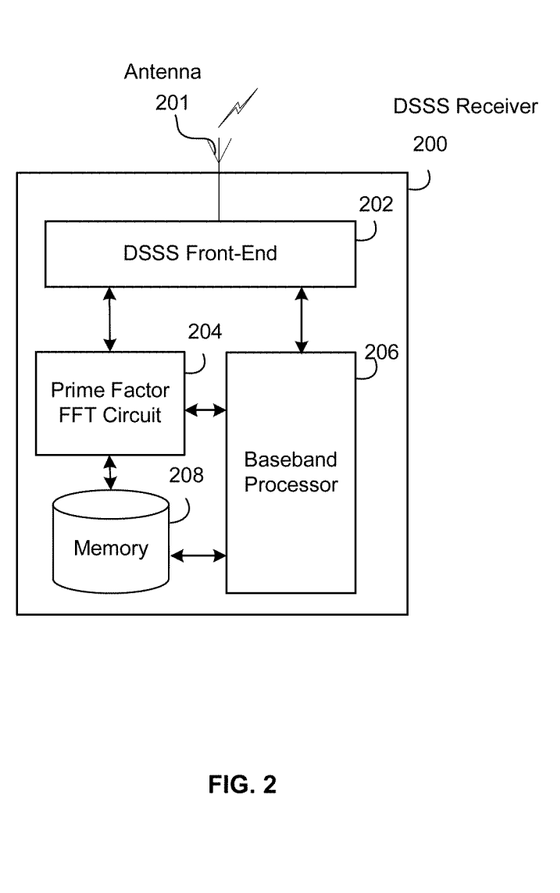
FIG. 2 is a block diagram illustrating an exemplary DSSS receiver that is operable to provide efficient DSSS FFT processing employing prime factor decomposition, in accordance with an embodiment of the invention.

FIG. 2 is a block diagram illustrating an exemplary DSSS receiver that is operable to provide efficient DSSS FFT processing employing prime factor decomposition, in accordance with an embodiment of the invention. Referring to FIG. 2, there is shown a DSSS receiver 200. The DSSS receiver 200 may comprise an antenna 201, a DSSS front-end 202, a prime factor FFT circuit 204, a baseband processor 206 and a memory 208.

The antenna 201 may comprise suitable logic, circuitry, interfaces and/or code that may be operable to communicate radio signals over the DSSS wireless communication network 130 and/or receive GNSS signals from a plurality of visible GNSS satellites such as the GNSS satellites 120a through 120c.

The DSSS front-end 202 may comprise suitable logic, circuitry, interfaces and/or code that may be operable to convert the received DSSS signals to baseband signals, which may be suitable for further processing in the prime factor FFT circuit 204 and/or the baseband processor 206. The DSSS front-end 202 may also be operable to decimate the baseband signals to match up to a chip rate of a PRN code for further processing such as, for example, a FFT correlation implemented by the prime factor FFT circuit 204.

The prime factor FFT circuit 204 may comprise suitable logic, circuitry, interfaces and/or code that may be operable to process a plurality of signal samples in frequency domain. The prime factor FFT circuit 204 may be operable to transform the plurality of signal samples into a plurality of FFT signal samples using a prime factor FFT. The prime factor FFT circuit 204 may be operable to transform a PRN code into a FFT PRN code using the prime factor FFT. The prime factor FFT circuit 204 may be operable to multiply the plurality of FFT signal samples with the FFT PRN code. The prime factor FFT circuit 204 may be operable to inversely transform the plurality of multiplied FFT signal samples into a plurality of correlated signal samples using a prime factor IFFT for further processing in the baseband processor 206. The prime factor FFT circuit 204 may be operable to perform a plurality of prime length FFTs during the prime factor FFT using a prime length FFT core in the prime factor FFT circuit 204 recursively. The prime factor FFT circuit 204 may be operable to perform the plurality of prime length FFTs with adjusted factors during the prime factor IFFT using the prime length FFT core in the prime factor FFT circuit 204 recursively. In this regard, same sample order at completion of the processing of the plurality of signal samples in frequency domain may be maintained by recursively performing the plurality of prime length FFTs in reversed order during the prime factor IFFT.

The prime factor FFT circuit 204 may be operable to store data from an output of the prime length FFT core temporarily for fetching and/or recombination during each iteration of the plurality of prime length FFTs using a FFT memory in the prime factor FFT circuit 204. The prime factor FFT circuit 204 may be operable to determine a data flow between the output of the prime length FFT core and the FFT memory during each iteration of the plurality of prime length FFTs using a register bank in the prime factor FFT circuit 204. The prime factor FFT circuit 204 may be operable to reorder the data in the FFT memory for an input of the prime length FFT core during each iteration of the plurality of prime length FFTs using a switch in the prime factor FFT circuit 204. The prime factor FFT circuit 204 may be operable to correlate the plurality of signal samples with the PRN code by multiplying the data associated with the plurality of FFT signal samples with the FFT PRN code during each iteration of the plurality of prime length FFTs using a multiplier in the prime factor FFT circuit 204. The prime factor FFT circuit 204 may be operable to control a sequence for the register bank, the switch and the multiplier working together with the prime length FFT core during each iteration of the plurality of prime length FFTs using a FFT controller in the prime factor FFT circuit 204.

The baseband processor 206 may comprise suitable logic, circuitry, interfaces and/or code that may be operable to process baseband signals from the DSSS front-end 202. The baseband processor 206 may be operable to further process the baseband signals from the prime factor FFT circuit 204 such as, for example, in a GNSS receiver, a non-coherent accumulation or integration.

The memory 208 may comprise suitable logic, circuitry, interfaces and/or code that may be operable to store information such as executable instructions, data and/or database that may be utilized by the prime factor FFT circuit 204 and the baseband processor 206. The memory 208 may comprise RAM, ROM, low latency nonvolatile memory such as flash memory and/or other suitable electronic data storage.

In operation, the prime factor FFT circuit 204 may be operable to transform a plurality of signal samples into a plurality of FFT signal samples using a prime factor FFT. The prime factor FFT circuit 204 may be operable to transform a PRN code into a FFT PRN code using the prime factor FFT. The prime factor FFT circuit 204 may be operable to multiply the plurality of FFT signal samples with the FFT PRN code. The prime factor FFT circuit 204 may be operable to inversely transform the plurality of multiplied FFT signal samples into a plurality of correlated signal samples using a prime factor IFFT for further processing by the baseband processor 206. The prime factor FFT circuit 204 may be operable to perform a plurality of prime length FFTs during the prime factor FFT using a prime length FFT core in the prime factor FFT circuit 204 recursively. The prime factor FFT circuit 204 may be operable to perform the plurality of prime length FFTs with adjusted factors during the prime factor IFFT using the prime length FFT core in the prime factor FFT circuit 204 recursively.

The prime factor FFT circuit 204 may be operable to store data from an output of the prime length FFT core temporarily for fetching and/or recombination during each iteration of the plurality of prime length FFTs using a FFT memory in the prime factor FFT circuit 204. The prime factor FFT circuit 204 may be operable to determine a data flow between the output of the prime length FFT core and the FFT memory during each iteration of the plurality of prime length FFTs using a register bank in the prime factor FFT circuit 204. The prime factor FFT circuit 204 may be operable to reorder the data in the FFT memory for an input of the prime length FFT core during each iteration of the plurality of prime length FFTs using a switch in the prime factor FFT circuit 204. The prime factor FFT circuit 204 may be operable to correlate the plurality of signal samples with the PRN code by multiplying the data associated with the plurality of FFT signal samples with the FFT PRN code during each iteration of the plurality of prime length FFTs using a multiplier in the prime factor FFT circuit 204. The prime factor FFT circuit 204 may be operable to control a sequence for the register bank, the switch and the multiplier working together with the prime length FFT core during each iteration of the plurality of prime length FFTs using a FFT controller in the prime factor FFT circuit 204.

Figure 3:
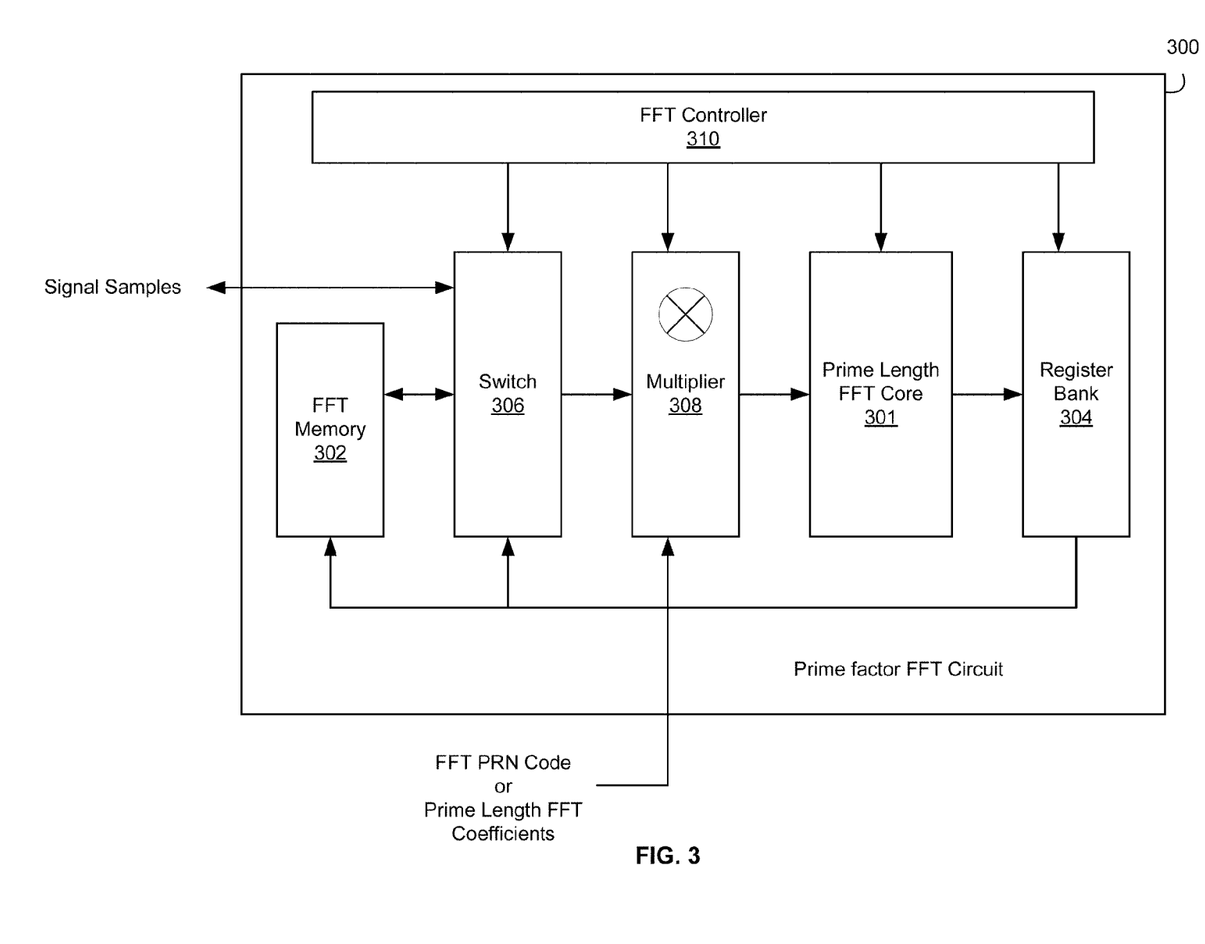
FIG. 3 is a block diagram illustrating an exemplary prime factor FFT circuit that is operable to provide efficient DSSS FFT processing employing prime factor decomposition, in accordance with an embodiment of the invention.

FIG. 3 is a block diagram illustrating an exemplary prime factor FFT circuit that is operable to provide efficient DSSS FFT processing employing prime factor decomposition, in accordance with an embodiment of the invention. Referring to FIG. 3, there is shown a prime factor FFT circuit 300. The prime factor FFT circuit 300 may comprise a prime length FFT core 301, a FFT memory 302, a register bank 304, a switch 306, a multiplier 308 and a FFT controller 310.

The prime length FFT core 301 may comprise suitable logic, circuitry, interfaces and/or code that may be operable to perform a plurality of prime length FFTs recursively during a prime factor FFT. The prime length FFT core 301 may also be operable to perform a plurality of prime length FFTs with adjusted factors recursively during a prime factor IFFT. The prime length FFT core 301 may comprise small networks of adders customized to perform circular convolution operations for each decomposed prime length FFT.

The FFT memory 302 may comprise suitable logic, circuitry, interfaces and/or code that may be operable to store data from an output of the prime length FFT core 301 temporarily for fetching and/or recombination during each iteration of the plurality of prime length FFTs.

The register bank 304 may comprise suitable logic, circuitry, interfaces and/or code that may be operable to determine a data flow between the output of the prime length FFT core 301 and the FFT memory 302 using, for example, a clock control mechanism during each iteration of the plurality of prime length FFTs.

The switch 306 may comprise suitable logic, circuitry, interfaces and/or code that may be operable to reorder the data in the FFT memory 302 for an input of the prime length FFT core 301 during each iteration of the plurality of prime length FFTs.

The multiplier 308 may comprise suitable logic, circuitry, interfaces and/or code that may be operable to multiply the data associated with a plurality of FFT signal samples with a FFT PRN code or prime length FFT coefficients during each iteration of the plurality of prime length FFTs.

The FFT controller 310 may comprise suitable logic, circuitry, interfaces and/or code that may be operable to control a sequence for the register bank 304, the switch 306 and the multiplier 308 working together with the prime length FFT core 301 during each iteration of the plurality of prime length FFTs.

In operation, the prime length FFT core 301 may be operable to perform a plurality of prime length FFTs recursively during a prime factor FFT. The prime length FFT core 301 may also be operable to perform a plurality of prime length FFTs with adjusted factors recursively during a prime factor IFFT. The FFT memory 302 may be operable to store data from an output of the prime length FFT core 301, temporarily, for fetching and/or recombination during each iteration of the plurality of prime length FFTs. The register bank 304 may be operable to determine a data flow between the output of the prime length FFT core 301 and the FFT memory 302 using, for example, a clock control mechanism during each iteration of the plurality of prime length FFTs. The switch 306 may be operable to reorder the data in the FFT memory 302 for an input of the prime length FFT core 301 during each iteration of the plurality of prime length FFTs. The multiplier 308 may be operable to multiply the data associated with a plurality of FFT signal samples with a FFT PRN code or prime length FFT coefficients during each iteration of the plurality of prime length FFTs. The FFT controller 310 may be operable to control a sequence for the register bank 304, the switch 306 and the multiplier 308 working together with the prime length FFT core 301 during each iteration of the plurality of prime length FFTs.

Figure 4:
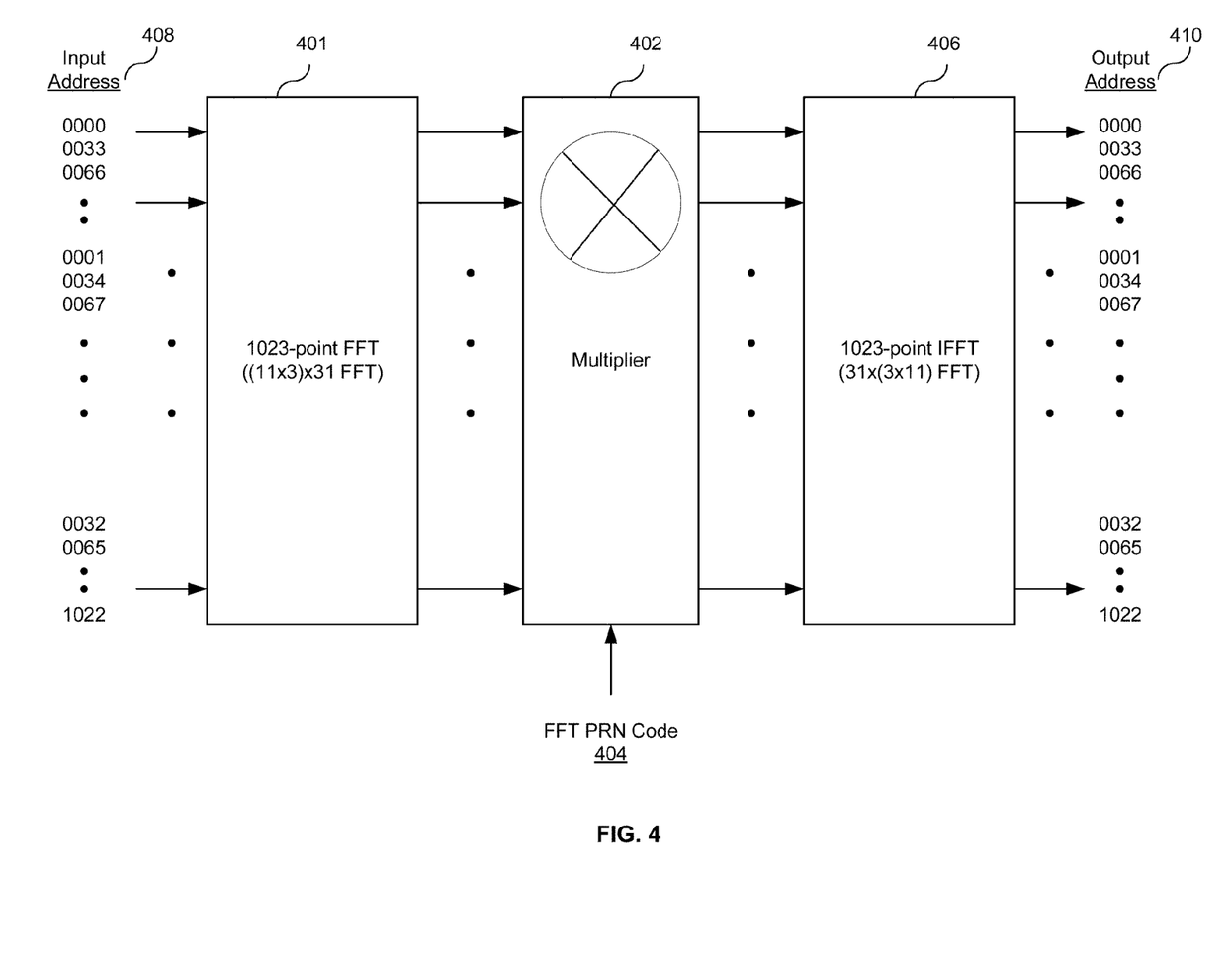
FIG. 4 is a block diagram illustrating an exemplary 1023-point FFT correlation sequence, in accordance with an embodiment of the invention.

FIG. 4 is a block diagram illustrating an exemplary 1023-point FFT correlation sequence, in accordance with an embodiment of the invention. Referring to FIG. 4, there is shown a 1023-point FFT 401, a multiplier 402, a FFT PRN code 404, a 1023-point IFFT, an input address 408 and an output address 410. In the exemplary embodiment of the invention illustrated in FIG. 4, a 1023-point FFT is shown. Notwithstanding, the invention is not so limited and the size of the FFT may be different such as, for example, a 2046-point FFT, a 511-point FFT, etc.

The 1023-point FFT 401 may be decomposed into a (11× 3)×31 FFT. The 1023-point FFT is achieved by first performing 31 33-point FFTs, followed by 33 31-point FFTs. The 33-point FFT is achieved by performing 3 11-point FFTs, followed by 11 3-point FFTs. The 31-point FFT, the 11-point FFT and the 3-point FFT are prime length FFTs. A frequency domain correlation or FFT correlation is achieved by multiplying a result of the 1023-point FFT 401 with the FFT PRN code 404 using the multiplier 402. The 1023-point IFFT 406 may be decomposed into a 31×(3×11) FFT with outputs adjusted. The 1023-point IFFT is achieved by first performing 33 31-point FFTs, followed by 31 33-point FFTs. The 33-point FFT is achieved by performing 11 3-point FFTs followed by 3 11-point FFTs. In this regard, the order of performing prime length FFTs during the 1023-point IFFT 406 is reversed. With this setup, the order of the output address 410 is the same as the order of the input address 408, and no output reordering may be necessary during the FFT correlation sequence.

In an exemplary embodiment of the invention, the DSSS receiver 200 such as, for example, a GPS receiver may be operable to transform a plurality of signal samples of a size, for example, 1023 in time domain into a plurality of FFT signal samples using, for example, the 1023-point FFT 401, multiply the plurality of FFT signal samples with the FFT PRN code 404 using the multiplier 402 and then inversely transform the plurality of multiplied FFT signal samples into a plurality of correlated signal samples in time domain using, for example, the 1023-point IFFT 406.

Figure 5:
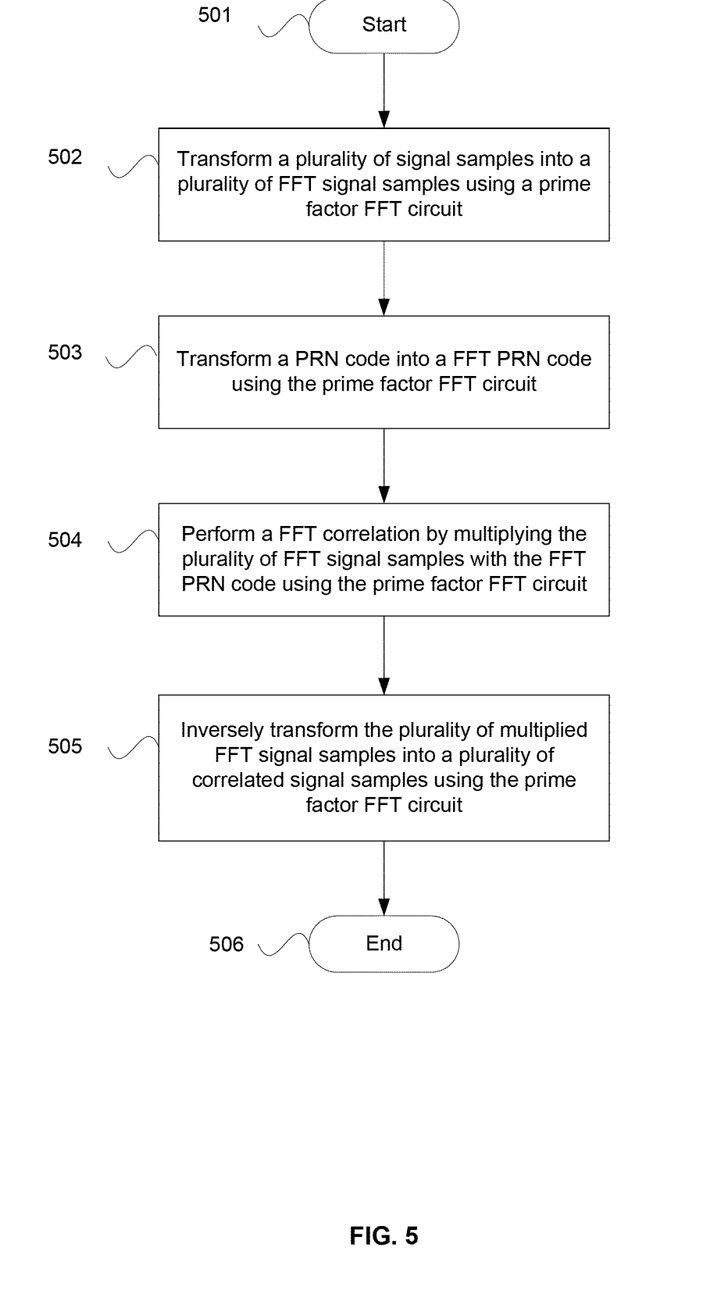
FIG. 5 is a flow chart illustrating exemplary steps for efficient DSSS FFT processing employing prime factor decomposition, in accordance with an embodiment of the invention.

FIG. 5 is a flow chart illustrating exemplary steps for efficient DSSS FFT processing employing prime factor decomposition, in accordance with an embodiment of the invention. Referring to FIG. 5, the exemplary steps start at step 501. In step 502, the DSSS receiver 200 may be operable to transform a plurality of signal samples into a plurality of FFT signal samples using a prime factor FFT circuit. In step 503, the DSSS receiver 200 may be operable to transform a PRN code into a FFT PRN code using the prime factor FFT circuit. In step 504, the DSSS receiver 200 may be operable to perform a FFT correlation by multiplying the plurality of FFT signal samples with the FFT PRN code using the prime factor FFT circuit. In step 505, the DSSS receiver 200 may be operable to inversely transform the plurality of multiplied FFT signal samples into a plurality of correlated signal samples using the prime factor FFT circuit. The exemplary steps may proceed to the end step 506.

In various embodiments of the invention, a DSSS receiver 200 may be operable to process a plurality of signal samples in frequency domain utilizing a prime factor FFT circuit 204 and a PRN code. In this regard, the DSSS receiver 200 may be operable to transform the plurality of signal samples into a plurality of FFT signal samples using a prime factor FFT implemented by the prime factor FFT circuit 204. The DSSS receiver 200 may be operable to transform the PRN code into a FFT PRN code using the prime factor FFT implemented by the prime factor FFT circuit 204. The DSSS receiver 200 may be operable to multiply the plurality of FFT signal samples with the FFT PRN code using the prime factor FFT circuit 204. The DSSS receiver 200 may be operable to inversely transform the plurality of multiplied FFT signal samples into a plurality of correlated signal samples using a prime factor IFFT implemented by the prime factor FFT circuit 204. The DSSS receiver 200 may be operable to perform a plurality of prime length FFTs during the prime factor FFT using a prime length FFT core 301 in the prime factor FFT circuit 300 recursively. The DSSS receiver 200 may be operable to perform the plurality of prime length FFTs with adjusted factors during the prime factor IFFT using the prime length FFT core 301 in the prime factor FFT circuit 300 recursively. In this regard, same sample order at completion of the processing of the plurality of signal samples in frequency domain may be maintained by recursively performing the plurality of prime length FFTs in reversed order during the prime factor IFFT.

The DSSS receiver 200 may be operable to store data from an output of the prime length FFT core 301 temporarily for fetching and/or recombination during each iteration of the plurality of prime length FFTs using a FFT memory 302 in the prime factor FFT circuit 300. The DSSS receiver 200 may be operable to determine a data flow between the output of the prime length FFT core 301 and the FFT memory 302 during each iteration of the plurality of prime length FFTs using a register bank 304 in the prime factor FFT circuit 300. The DSSS receiver 200 may be operable to reorder the data in the FFT memory 302 for an input of the prime length FFT core 301 during each iteration of the plurality of prime length FFTs using a switch 306 in the prime factor FFT circuit 300. The DSSS receiver 200 may be operable to correlate the plurality of signal samples with the PRN code by multiplying the data associated with the plurality of FFT signal samples with the FFT PRN code during each iteration of the plurality of prime length FFTs using a multiplier 308 in the prime factor FFT circuit 300. The DSSS receiver 200 may be operable to control a sequence for the register bank 304, the switch 306 and the multiplier 308 working together with the prime length FFT core 301 during each iteration of the plurality of prime length FFTs using a FFT controller 310 in the prime factor FFT circuit 300.

The DSSS receiver 200 may comprise a global navigation satellite system (GNSS) receiver such as, for example, a GPS receiver, a GLONASS receiver, a Galileo receiver, a Compass receiver, a QZSS receiver and/or an IRNSS receiver.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for efficient DSSS FFT processing employing prime factor decomposition.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication in a direct sequence spread spectrum (DSSS) receiver comprising a prime factor fast Fourier transform (FFT) circuit, the method comprising:
   processing, in said prime factor FFT circuit, a plurality of signal samples in a frequency domain utilizing a pseudorandom noise (PRN) code, said prime factor FFT circuit being configured to perform a prime factor FFT, wherein said processing includes:
      transforming, utilizing said prime factor FFT, said plurality of signal samples into a plurality of FFT signal samples;
      transforming, utilizing said prime factor FFT, said PRN code into a FFT PRN code; and
      multiplying said plurality of FFT signal samples with said FFT PRN code.

2. The method according to claim 1, wherein said prime factor FFT circuit is further configured to perform a prime factor inverse FFT (IFFT), and said processing further comprises:
inversely transforming, utilizing said prime factor IFFT, said plurality of multiplied FFT signal samples into a plurality of correlated signal samples.

3. The method according to claim 2, wherein said prime factor FFT circuit comprises a prime length FFT core, the method further comprising:
recursively performing, by said prime length FFT core, a plurality of prime length FFTs during said prime factor FFT; and
recursively performing, by said prime length FFT core, said plurality of prime length FFTs with adjusted factors during said prime factor IFFT.

4. The method according to claim 3, further comprising:
maintaining same sample order at completion of said processing of said plurality of signal samples by recursively performing said plurality of prime length FFTs in a reversed order during said prime factor IFFT.

5. The method according to claim 3, wherein said prime factor FFT circuit comprises an FFT memory, the method further comprising:
storing data from an output of said prime length FFT core temporarily, wherein said prime factor FFT circuit is configured to fetch or recombine said stored data during each iteration of said plurality of prime length FFTs.

6. The method according to claim 5, wherein said prime factor FFT circuit comprises a register bank, the method further comprising:
determining, using said register bank, a data flow between said output of said prime length FFT core and said FFT memory during each iteration of said plurality of prime length FFTs.

7. The method according to claim 6, wherein said prime factor FFT circuit comprises a switch, the method further comprising:
reordering, using said switch, said data in said FFT memory and supplying said reordered data as an input of said prime length FFT core during each iteration of said plurality of prime length FFTs.

8. The method according to claim 7, wherein said prime factor FFT circuit comprises a multiplier, the method further comprising:
correlating, using said multiplier, said plurality of signal samples with said PRN code by multiplying data associated with said plurality of signal samples with said FFT PRN code during each iteration of said plurality of prime length FFTs.

9. The method according to claim 8, wherein said prime factor FFT circuit comprises a controller, the method further comprising:
controlling, using said controller, a sequence for said register bank, said switch and said multiplier to cooperatively operate with said prime length FFT core during each iteration of said plurality of prime length FFTs.

10. The method according to claim 1, wherein said DSSS receiver comprises a global navigation satellite system (GNSS) receiver, and said GNSS receiver comprises a global positioning system (GPS) receiver, a GLObal NAvigation Satellite System (GLONASS receiver, a Galileo receiver, a Compass receiver, a quasi-zenith satellite system (QZSS) receiver or an Indian regional navigation satellite system (IRNSS) receiver.

11. A direct-sequence spread spectrum (DSSS) receiver, the receiver comprising:
a prime factor fast Fourier transform (FFT) circuit configured to:
transform a plurality of signal samples into a plurality of FFT signal samples;
transform a pseudorandom noise (PRN) code into a FFT PRN code; and
multiply said plurality of FFT signal samples with said FFT PRN code.

12. The receiver according to claim 11, wherein said prime factor FFT circuit is further configured to:
inversely transform said plurality of multiplied FFT signal samples into a plurality of correlated signal samples.

13. The receiver according to claim 12, wherein said prime factor FFT circuit comprises a prime length FFT core, said prime length FFT core being configured to:
recursively perform a plurality of prime length FFTs during said prime factor FFT; and
recursively perform said plurality of prime length FFTs with adjusted factors during a prime factor inverse FFT (IFFT).

14. The receiver according to claim 13, wherein said prime factor FFT circuit is further configured to maintain same sample order at completion of processing of said plurality of signal samples in a frequency domain by recursively performing said plurality of prime length in a reversed order during said prime factor IFFT.

15. The receiver according to claim 13, wherein said prime factor FFT circuit comprises a FFT memory configured to temporarily store data from an output of said prime length FFT core, wherein said prime factor FFT circuit is further configured to fetch or recombine said stored data during each iteration of said plurality of prime length FFTs.

16. The receiver according to claim 15, wherein said prime factor FFT circuit comprises a register bank, wherein said prime factor FFT circuit is further configured to determine, using said register bank, a data flow between said output of said prime length FFT core and said FFT memory during each iteration of said plurality of prime length FFTs.

17. The receiver according to claim 16, wherein said prime factor FFT circuit comprises a switch, wherein said prime factor FFT circuit is further configured to reorder, using said switch, said data in said FFT memory, said reordered data being supplied as an input of said prime length FFT core during each iteration of said plurality of prime length FFT.

18. The receiver according to claim 17, wherein said prime factor FFT circuit comprises a multiplier, wherein said prime factor FFT circuit is further configured to correlate, using said multiplier, said plurality of signal samples with said PRN code by multiplying data associated with said plurality of FFT signal samples with said FFT PRN code during each iteration of said plurality of prime length FFTs.

19. The receiver according to claim 18, wherein said prime factor FFT circuit comprises a controller, wherein said prime factor FFT circuit is further configured to control, using said controller, a sequence for said register hank, said switch and said multiplier to cooperatively operate with said prime length FFT core during each iteration of said plurality of prime length FFTs.

20. The receiver according to claim 11, wherein said DSSS receiver comprises a global navigation satellite system (GNSS) receiver, and said GNSS receiver comprises a global, positioning system (GPS) receiver, a GLObal NAvigation Satellite System (GLONASS) receiver, a Galileo receiver, a Compass receiver, a quasi-zenith satellite system (QZSS) receiver or an Indian regional navigation satellite system (IRNSS) receiver.

* * * * *

UNITED STATES PATENT AND TRADEMARK OFFICE
CERTIFICATE OF CORRECTION

PATENT NO.         : 8,611,397 B2  
APPLICATION NO.    : 12/643494  
DATED              : December 17, 2013  
INVENTOR(S)        : Norman et al.

It is certified that error appears in the above-identified patent and that said Letters Patent is hereby corrected as shown below:

In the Claims

Claim 8, Column 11, line 48, replace "said plurality of signal samples" with --said plurality of FFT signal samples--.
Claim 14, Column 12, line 25, replace "prime length in a reversed order" with --prime length FFTs in a reversed order--.
Claim 17, Column 12, line 44, replace "prime length FFT" with --prime length FFTs--.
Claim 20, Column 12, lines 61-62, replace "a global, positioning system" with --a global positioning system--.

Signed and Sealed this  
Fifteenth Day of April, 2014

Michelle K. Lee  
*Deputy Director of the United States Patent and Trademark Office*